No. 690,106. Patented Dec. 31, 1901.
P. HANSEL.
MACHINE FOR MAKING DOVETAILS.
(Application filed Jan. 25, 1901.)
(No Model.) 2 Sheets—Sheet 1.

Witnesses:
June Liberty
Willi Kasper.

Inventor:
Paul Hansel
per Gerson & Sachse
his Attorneys.

No. 690,106. Patented Dec. 31, 1901.
P. HANSEL.
MACHINE FOR MAKING DOVETAILS.
(Application filed Jan. 25, 1901.)
(No Model.) 2 Sheets—Sheet 2.

Witnesses:
[signature]
Willi Kasper.

Inventor:
Paul Hansel
per Gerson & Sachse
his Attorneys.

UNITED STATES PATENT OFFICE.

PAUL HANSEL, OF OTTENSEN, GERMANY.

MACHINE FOR MAKING DOVETAILS.

SPECIFICATION forming part of Letters Patent No. 690,106, dated December 31, 1901.

Application filed January 25, 1901. Serial No. 44,745. (No model.)

*To all whom it may concern:*

Be it known that I, PAUL HANSEL, a subject of the Emperor of Germany, residing at 250 Bahrenfelderstrasse, Ottensen, German Empire, have invented a new and useful Machine for Making Dovetails, of which the following is a specification.

My invention consists of a new and improved shaping-machine for producing in a board to be dovetailed the desired dovetail tenons.

In the following specification the invention is fully described and set forth, so that any one skilled in the art may readily understand the machine.

Figure 1:
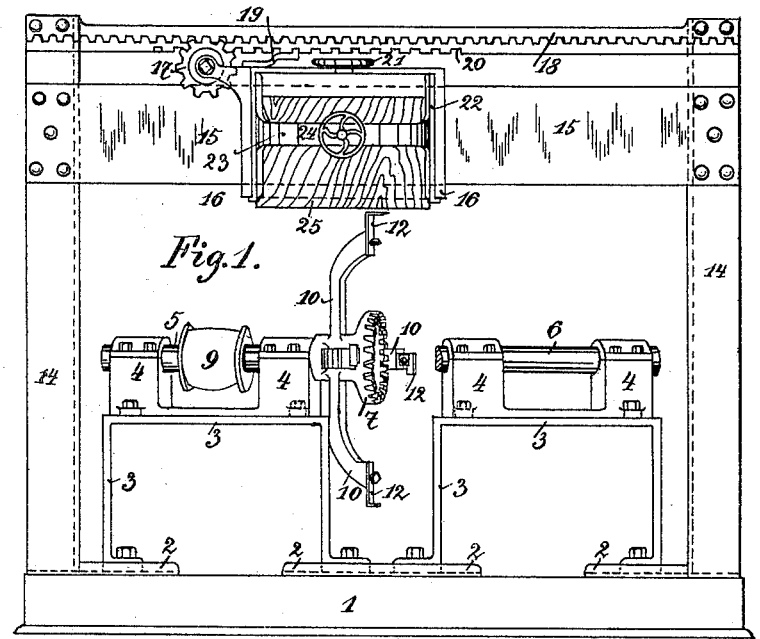
Figure 3:
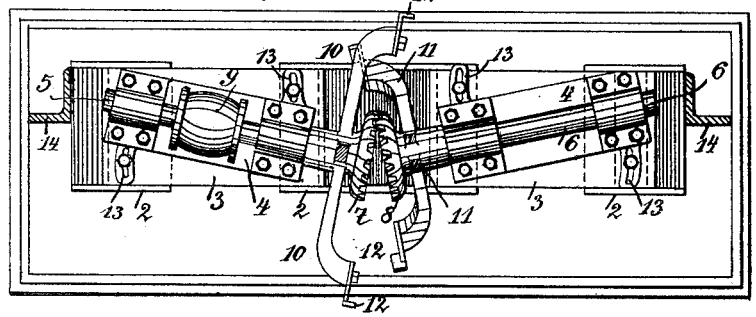
Figure 2:
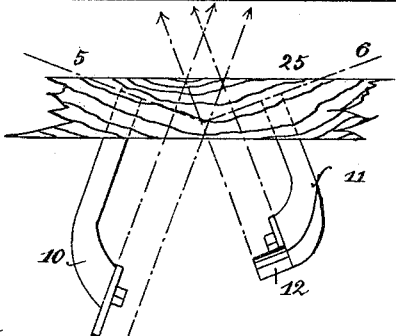
Figure 4:
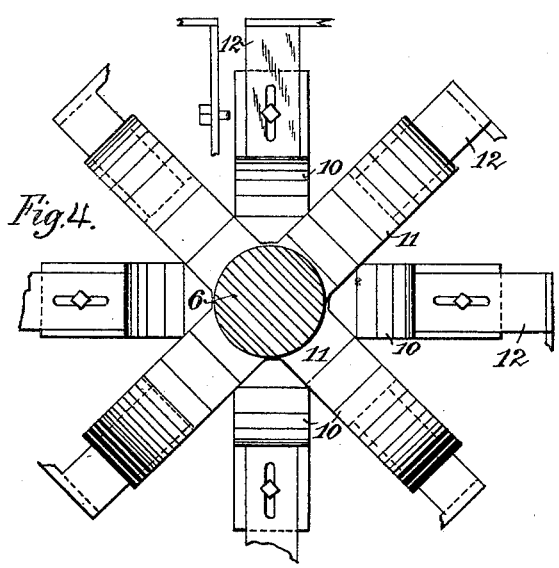

In the accompanying drawings, in which similar figures of reference refer throughout to similar parts, Figure 1 shows an elevation of the machine. Fig. 2 is partially a horizontal section and partially a plan of Fig. 1. Fig. 3 is a diagram illustrating the action of the knife-heads. Fig. 4 represents the plan of the knife-heads.

Mounted upon a bed-plate 1 are frames 3, which are adjustable to and fro in the guideways formed by the grooved plates 2, fastened on the upper face of bed-plate 1. Standards 4 4 are mounted on frames 3 3 and have slotted ears 13 13, Fig. 2, near their base, through which clamping-bolts are passed in order to fasten them to said frames. As these ears 13 are so slotted the standards may be angularly adjusted within certain limits for the purposes hereinafter set forth.
Formed in each of standards 4 are suitable bearings in which are mounted axles 5 6, carrying on their adjacent ends meshing cogs 7 and 8. On one of said axles 5 and 6 a belt-pulley 9 is fastened, the belt for which is preferably led thereto over a sheave or guide-pulley, (not shown,) so as to insure its constant engagement at whatever angle the shafts or axles are adjusted. Mounted on each axle and behind the respective cogs 7 and 8 are the knife-heads, each consisting of an equal number of arms 10 11, fastened rigidly onto their respective axles. Each arm is provided near its outer end with an angular slotted groove in which the shank of a knife 12 is adjustably secured by a clamping-bolt. (See Fig. 4.) Secured to the said plate 1 are suitable uprights 14, to which are fastened the ends of a horizontal rail 15, on which is sliding a support 16. A pinion 17, journaled on said support-gears with a rack 18, fastened between said uprights 14. A pawl 19, also connected with said support 16, engages a toothed rack 20, while a hand-wheel 21, provided with some suitable device, as a worm-gear, (not shown,) is also fastened on said support and engages a slide 22, vertically adjustable in said support. A curved arm 23, connected with said slide, carries a clamping-screw 24, by means of which the board, &c., 25 which is to have the tenons formed on its lower edge is secured and held in position. By revolving wheel 21 the said board is carried downwardly, so as to continually present a fresh surface to the knives as they cut their way in when forming the tenon, and by releasing pawl 19 the support may be moved along the rail 15 for the purpose of forming another tenon, while the toothed rack 20 permits exact spacing of the said tenons.

The action of the pair of knife-heads for forming the tenons is most easily seen from the diagram shown by Fig. 3. Here the axles are represented by dotted lines 5 and 6. Radially extending therefrom are the respective knife-head arms 10 and 11, the heads being so mounted on their respective axles that their arms stand at a certain equal angle from each other. As each head is here shown with four arms, it consequently follows that they are in this instance at angles of forty-five degrees from one another. As the axles 5 and 6 rotate the arms are carried therewith, the planes of which form an acute angle, so that as the several knives are in the act of cutting they are momentarily crossing the plane described by those arms next adjacent on each side, while the latter belong to the other knife-head. This angle can be modified by adjusting the standards 4 4, so that any desired tenon may be formed, while its width can be regulated by advancing or withdrawing the frames 3 3 in their respective guides. Cogs 7 and 8 may be replaced by any universal coupling, it being only essential that the axles 5 and 6 rotate together, inasmuch as otherwise since their respective knife-arms are constantly crossing each other's planes they would conflict.

It will be observed that the arms of the respective heads overlap each other on the center line of the two axles.

The knives while cutting out the material between the desired tenons necessarily remove arc-shaped chips, leaving a slightly concave bottom, the edges of which are then adapted to fit perfectly against the respective mortises.

Having now described my invention, what I claim as new, and desire to protect by Letters Patent, is—

A shaping-machine for manufacturing tenons comprising a base-plate, adjustable frames thereon, adjustable standards mounted in said frames, axles mounted in said standards coupled in pairs and adapted to be set at any desired angle to each other, knife-heads comprising a plurality of radial arms mounted in said axles, said arms being adapted to alternately cross the planes described by those next adjacent, adjustable knives in the ends of said arms, and suitable and movable supports for carrying and holding the boards, said parts being combined substantially as and for the purpose described.

PAUL HANSEL.

Witnesses:
E. H. L. MUMMENHOFF,
IDA HAFERMANN.